US008850727B2

(12) United States Patent
Malina et al.

(10) Patent No.: US 8,850,727 B2
(45) Date of Patent: Oct. 7, 2014

(54) LICENSE PLATE BUMPER

(76) Inventors: Ronnie Malina, Nanuet, NY (US); Eric Malina, Nanuet, NY (US)

( * ) Notice: Subject to any disclaimer, the term of this patent is extended or adjusted under 35 U.S.C. 154(b) by 0 days.

(21) Appl. No.: 13/220,241

(22) Filed: Aug. 29, 2011

(65) Prior Publication Data

US 2013/0047476 A1 Feb. 28, 2013

(51) Int. Cl.
*G09F 7/00* (2006.01)
*B60R 13/10* (2006.01)
*B60R 19/50* (2006.01)

(52) U.S. Cl.
CPC ............... *B60R 13/105* (2013.01); *B60R 19/50* (2013.01)
USPC ........................................................ 40/209

(58) Field of Classification Search
CPC ........................... B60R 19/50; B60R 2019/50

USPC ............................................................ 40/209
See application file for complete search history.

(56) References Cited

U.S. PATENT DOCUMENTS

| 4,970,809 | A  | * | 11/1990 | Bushbaum | 40/209 |
| 7,316,433 | B2 | * | 1/2008  | Levine   | 293/142 |
| 2003/0196355 | A1 | * | 10/2003 | Castro | 40/209 |
| 2005/0093684 | A1 | * | 5/2005 | Cunnien | 340/435 |
| 2006/0156595 | A1 | * | 7/2006 | Kasak et al. | 40/209 |
| 2008/0250680 | A1 | * | 10/2008 | MacNeil | 40/209 |
| 2012/0227294 | A1 | * | 9/2012 | Weber | 40/209 |

* cited by examiner

*Primary Examiner* — Kristina Junge
(74) *Attorney, Agent, or Firm* — Jeffrey Sonnabend; SonnabendLaw

(57) ABSTRACT

This application relates to a structure for a license plate. Specifically, it relates to a device for attaching a license plate to a vehicle. In particular, it relates to a license plate frame for a vehicle which both supports the license plate and has a fin extending therefrom to protect the vehicle.

20 Claims, 5 Drawing Sheets

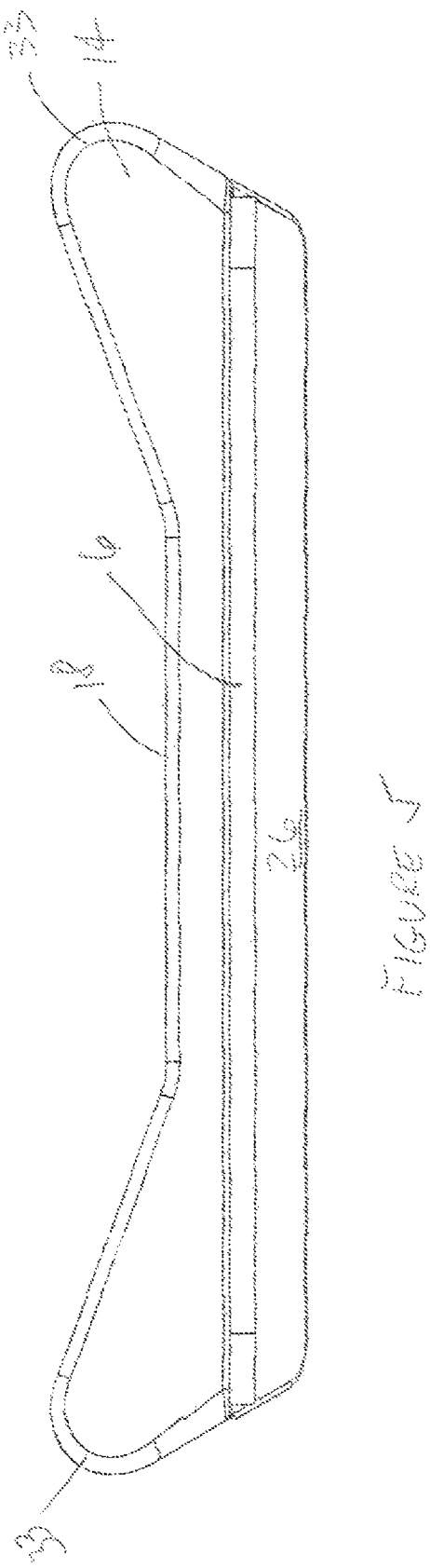

LICENSE PLATE BUMPER

BACKGROUND OF THE INVENTION

1. Field of the Invention

The present invention generally relates to a structure for a license plate. Specifically, the present invention relates to a device for attaching a license plate to a vehicle. In particular, the present invention relates to a license plate frame for a vehicle which both supports the license plate and protects the vehicle.

2. Description of the Related Art

Typically, license plates are made of metal that can easily bend. Thus, when they are directly attached to car bumpers, and especially when they hang below the bumper itself, they can become malformed and unsightly. Accordingly, license plates have often been attached to bumpers with a support frame, thereby attempting to protect the structural integrity of the license plate. Support frames have had limited success in this endeavor and, additionally, have done nothing to protect the vehicle itself, particularly the grill of the vehicle. There is therefore a great need in the art for a device which can both protect the license plate as well as the vehicle.

Accordingly, there is now provided with this invention an improved license plate frame for a vehicle that has effectively overcome the aforementioned difficulties and longstanding problems inherent in license plate frames.

SUMMARY OF THE INVENTION

According to one aspect of the invention, a structure for a license plate is disclosed comprising a rear section having an upper edge, a lower edge, and side edges bridging the upper and lower edges. The rear section has a first set of holes for securing the license plate to a vehicle therethrough. The structure also has a frame extending from the rear section having a upper member attached to the upper edge, a lower member attached to the lower edge, and side members each attached to respective side edges. Each of the side members extend upwardly and outwardly from the respective side edges. The frame further includes a second set of holes for securing the license plate to a vehicle therethrough. The structure further has a fin extending upwardly from the upper edge.

According to another aspect of the invention, a device for attaching a license plate to a vehicle is disclosed comprising a rear section having holes for securing the license plate to the vehicle therethrough and side arms extending forward of the rear section. The side arms further extend upward from the rear section, downward from the rear section, and outward from the rear section. The device also includes a fin extending upwardly and rearwardly from the rear section.

According to yet another aspect of the invention, a license plate frame for a vehicle is disclosed comprising a rear section for abutting the vehicle. The rear section has rear lobes extending therefrom, wherein each rear lobe has a hole therethrough. The frame also includes a front section for framing the license plate. The front section has front lobes extending therefrom, wherein each front lobe has a recessed hole therethrough aligned with each hole in each rear lobe. The front section also has a front face that is closer to the rear section at its middle than at its ends. The frame further includes a fin extending upwardly and rearwardly from the rear section.

As will be appreciated by those persons skilled in the art, a major advantage provided by the present invention that both a license plate and a vehicle can be protected with an aesthetically pleasing structure. Additional objects of the present invention will become apparent from the following description.

The method and apparatus of the present invention will be better understood by reference to the following detailed discussion of specific embodiments and the attached figures which illustrate and exemplify such embodiments.

DESCRIPTION OF THE DRAWINGS

A specific embodiment of the present invention will be described with reference to the following drawings, wherein:

FIG. 5 is a bottom view of the present invention.

DESCRIPTION OF THE PREFERRED EMBODIMENT

The following preferred embodiment as exemplified by the drawings is illustrative of the invention and is not intended to limit the invention as encompassed by the claims of this application. An apparatus and method for attaching a license plate to a vehicle is disclosed herein.

The apparatus 1, as illustrated generally in FIGS. 1-5, illustrates a structure for attaching a license plate to a vehicle. The structure is typically manufactured of flexible rubber, although may be a combination of metal and rubber.

Figure 1:
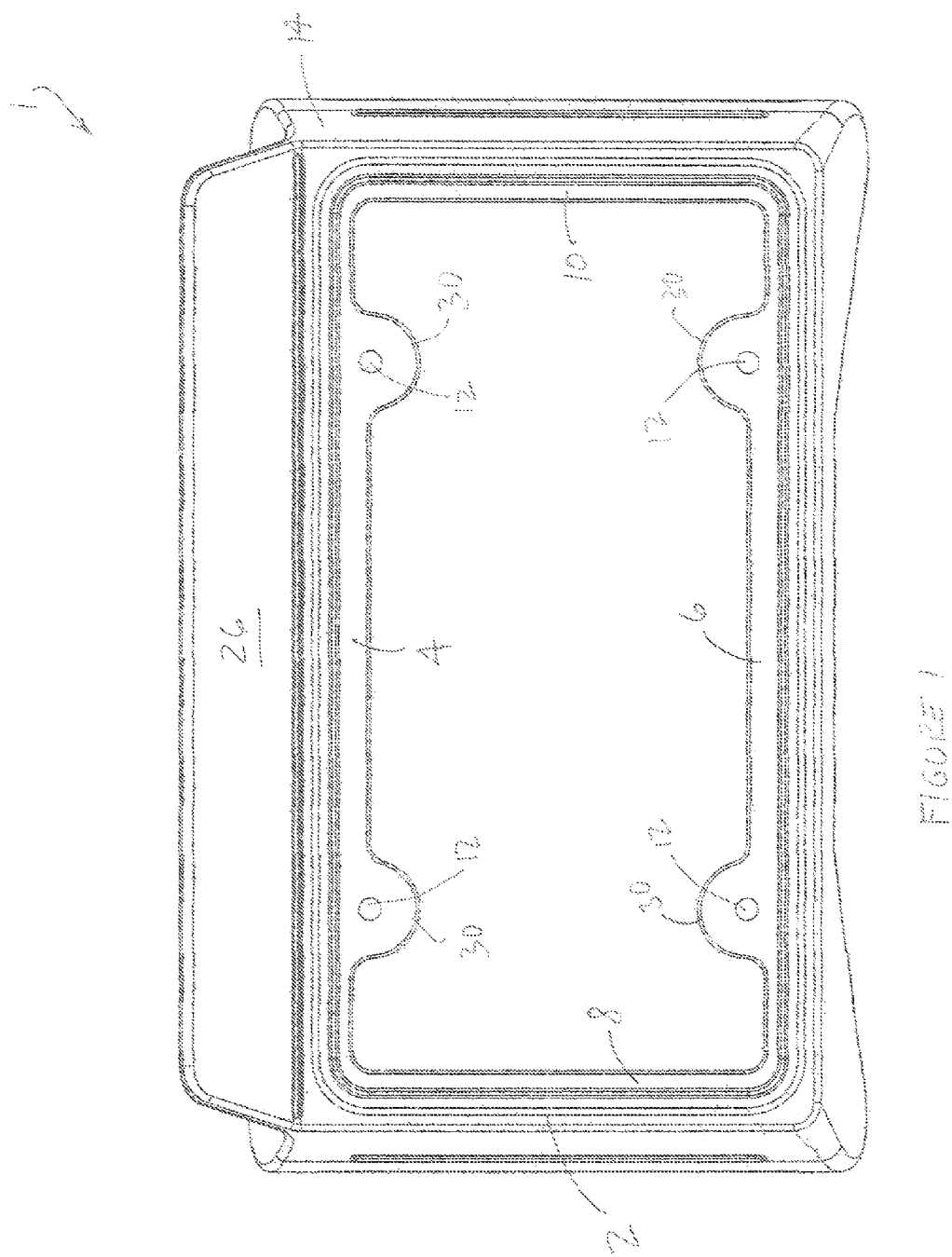
FIG. 1 is a rear view of the present invention.

FIG. 1 illustrates a rear view of the structure. The structure has a rear section 2. The rear section has an upper edge 4, a lower edge 6, a first side edge 8, and a second side edge 10. The side edges 8 and 10 bridge the upper edge 4 with the lower edge 6. The rear section 2 has a first set of holes 12 for securing the license plate to a vehicle therethrough. As shown generally in the figures, the first set of holes 12 include two holes in the upper edge 4 of the rear section and two holes in the lower edge 6 of the rear section. This is because typical license plates are similarly issued with corresponding holes so placed. Of course, if future license plates are issued with differently situated mounting holes, the rear section would also have a correspondingly differently situated first set of holes 12 for securing the license plate to a vehicle.

Figure 2:
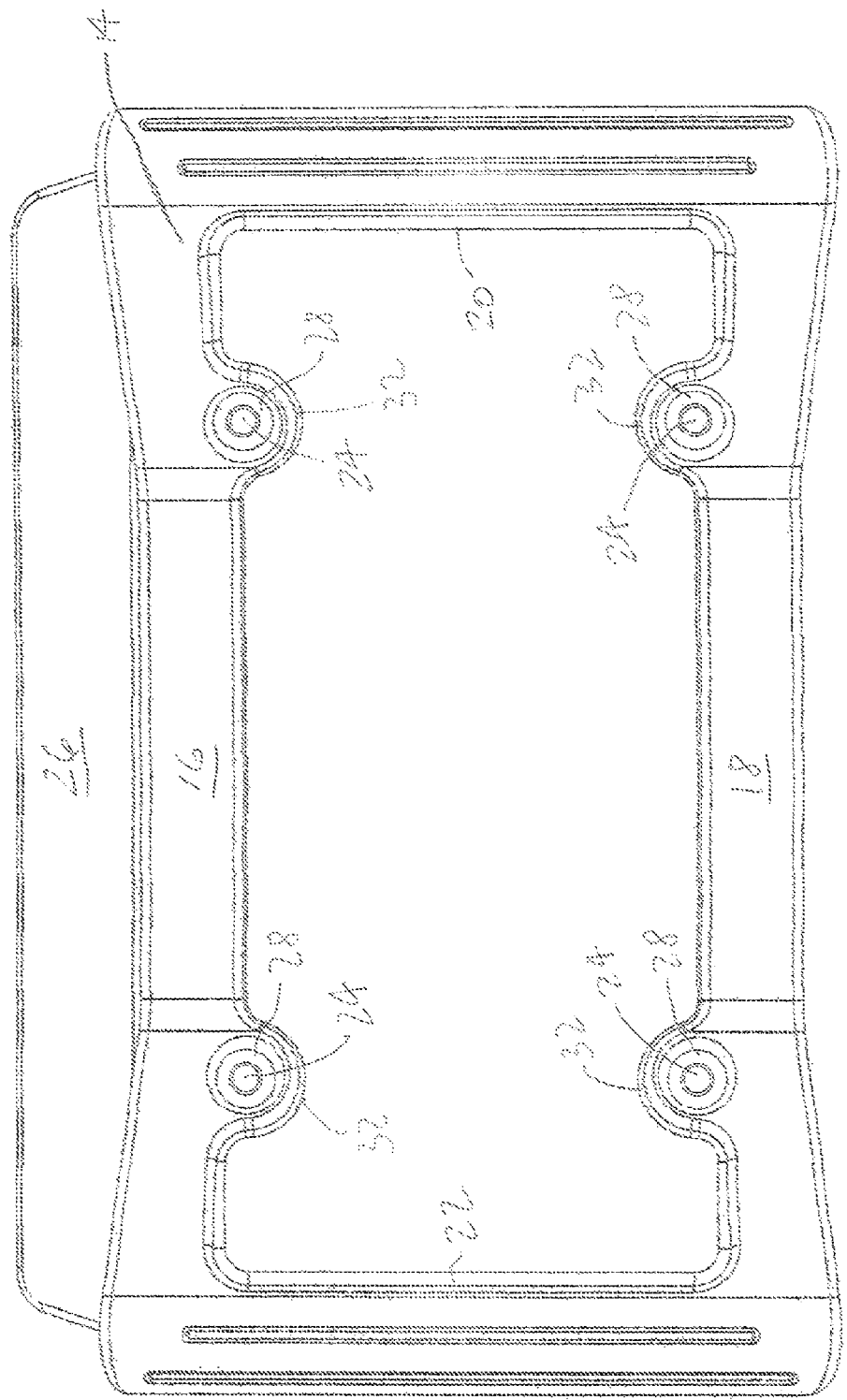
FIG. 2 is a front view of the present invention.

As shown in FIG. 2, illustrating a front view of the present invention, a frame 14 extends from the rear section 2. The frame 14 has an upper cross-member 16 attached to the upper edge 4, a lower cross-member 18 attached to the lower edge 6, a first side member 20 attached to the first side edge 8, and a second side member 22 attached to the second side edge 10. Each of the side members 20 and 22 extend upwardly and outwardly from their respective side edges 8 and 10. Typically, the upper cross-member and the lower cross-member have substantially the same cross-sectional profile although, for aesthetic and other reasons the upper member and lower member may be made to have different cross-sectional profiles. Typically, the side members have substantially the same cross-sectional profile.

The frame 14 has a second set of holes 24 for securing the license plate to a vehicle therethrough. Each of the second set of holes 24 are aligned with each of the corresponding first set of holes 12 in the rear section. As shown generally in the figures, the second set of holes 24 include two holes in the upper cross-member 16 of the frame and two holes in the lower cross-member 18 of the frame. This is because typical license plates are similarly issued with corresponding holes so placed. Of course, if future license plates are issued with differently situated mounting holes, the frame would also have a correspondingly differently situated second set of holes 24 for securing the license plate to a vehicle.

The license plate fits between the first set of holes 12 and the second set of holes 24. A bolt, screw, or other attachment device therefore extends through each of the second set of holes 24 through holes in the license plate, through the first set of holes 12, and into corresponding holes in the vehicle, typically through holes in the bumper of the vehicle.

As shown in the figures, the structure further includes a fin 26 extending upwardly from the upper edge 4 of the rear section. The fin 26 extends upwardly to protect the vehicle from minor impacts due, for example, from other vehicles backing into the structure. The fin 26 may be made to extend upwardly a small or large distance depending on the vehicle it is designed to protect. The profile of the fin 26 is shown as trapezoidally shaped but may be any of a variety of profiles, for example, rectangularly or pyramidally shaped.

As further illustrated in FIG. 2, the second set of holes 24 may each include a recess 28 for a head of the attachment device. Further, the rear section may comprise a first set of lobes 30 through which the first set of holes 12 extend and the frame may comprise a second set of lobes 32 through which the second set of holes 24 extend.

Figure 3:
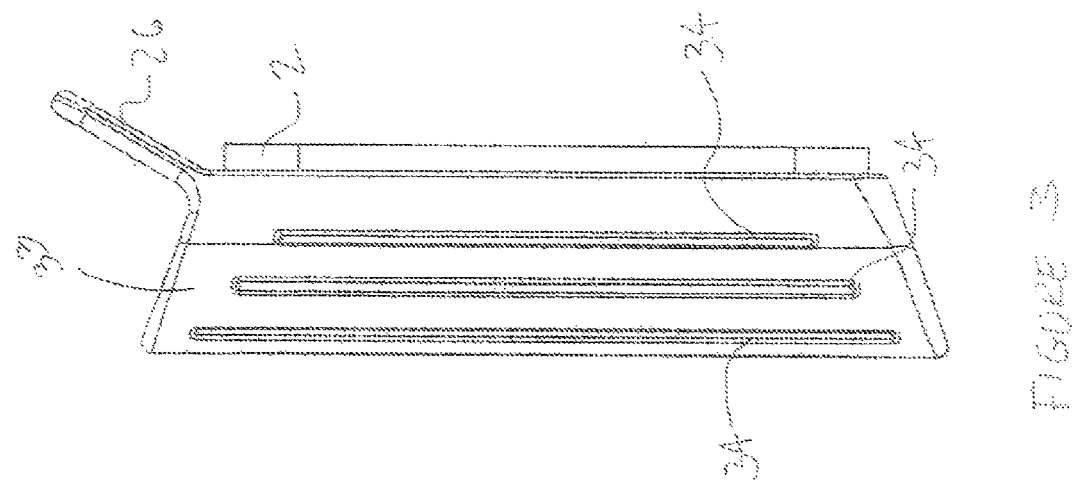
FIG. 3 is a side view of the present invention.
Figure 4:
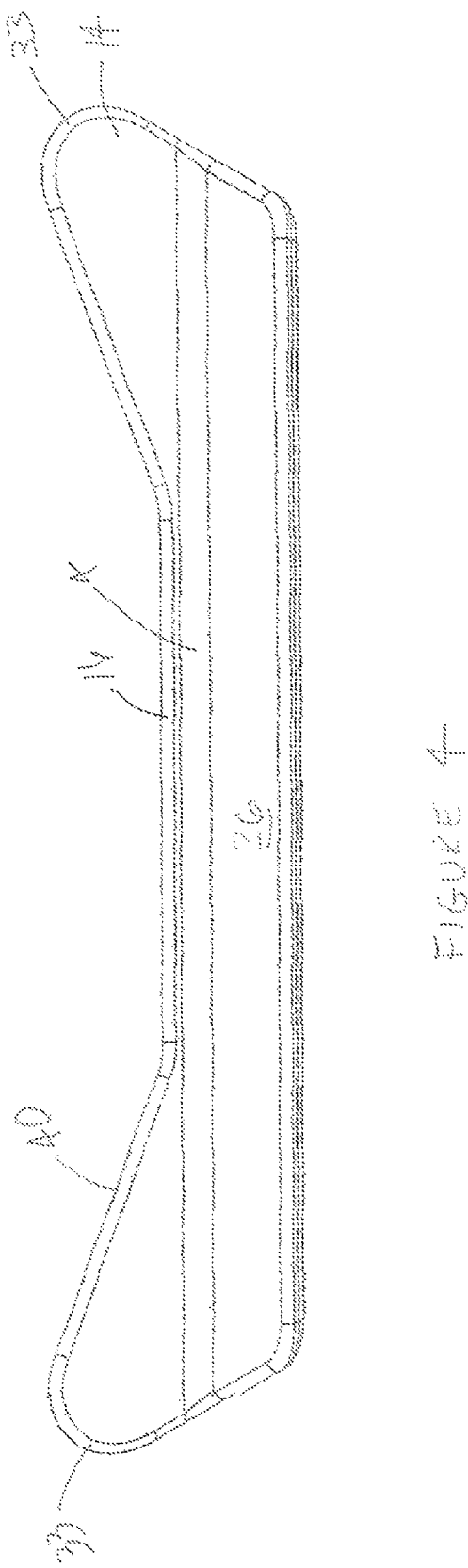
FIG. 4 is a top view of the present invention.

As shown in the side view of FIG. 3, the top view of FIG. 4, and the bottom view of FIG. 5, the fin 26 may extend rearwardly from the upper edge. As further shown in FIG. 3, the frame may include side arms 33 extending forward of the rear section. The side arms 33 may also extend upward from the rear section. The side arms 33 may further extend downward from the rear section. The side arms may still further extend outward from the rear section. The side arms may also include ribs 34 for providing increased protection and additional structural integrity to the license plate structure.

As shown in FIGS. 4 and 5, the upper cross-member 16 and the lower cross-member 18 may be tapered at their respective mid-sections toward the rear section. The top view of FIG. 4 further shows the upper cross-member 16 connected to the upper edge 4 of the rear section and bridging the side arms 33. The upper cross-member is typically connected to the rear section along its entire length. The bottom view of FIG. 5 shows the lower cross-member 18 connected to the lower edge 6 of the rear section and bridging the side arms. The lower cross-member is typically connected to the rear section along its entire length.

Typically, the rear section may be constructed of either an open construction or a closed construction. That is, when viewed from the rear, a closed rear section backs the entirety of the back of the license plate. Correspondingly, an open rear section only supports the periphery of the license plate. In either case, the rear section typically abuts the vehicle. Of course, the front face 40 of the frame side will always be open so as to be able to view the license plate indicia. As shown in both FIGS. 4 and 5, the front face 40 of the frame may be made closer to the rear section at its middle than at its ends.

Although the particular embodiments shown and described above will prove to be useful in many applications in the vehicular art to which the present invention pertains, further modifications of the present invention will occur to persons skilled in the art. All such modifications are deemed to be within the scope and spirit of the present invention as defined by the appended claims.

What is claimed is:

1. A structure for a license plate, comprising:
   a. a rear section having an upper edge, a lower edge, and side edges bridging the upper and lower edges, wherein the rear section has a first set of holes for securing the license plate to a vehicle therethrough;
   b. a frame extending from the rear section having a upper member attached to the upper edge, a lower member attached to the lower edge, and side members each attached to respective side edges, wherein the upper member has a substantially straight central portion and upwardly angled outer portions extending from the upper member central portion to the respective side members, and the lower member has a substantially straight central portion and downwardly angled outer portions extending from the lower member central portion to the respective side members, wherein each of the side members extend upwardly and outwardly from the respective side edges, the side members extending beyond the upper edge and below the lower edge and outwardly beyond the side edges, and wherein the frame includes a second set of holes for securing the license plate to a vehicle therethrough.

2. The structure of claim 1, wherein the second set of holes each have a recess.

3. The structure of claim 1, wherein the rear section further comprises a first set of lobes through which the first set of holes extend.

4. The structure of claim 1, wherein the frame further comprises a second set of lobes through which the second set of holes extend.

5. The structure of claim 1, further comprising a fin extending upwardly from the upper edge, wherein the fin extends rearwardly from the upper edge.

6. The structure of claim 1, wherein the side members are ribbed.

7. The structure of claim 1, wherein the upper member and the lower member are tapered at their respective mid sections toward the rear section.

8. The structure of claim 1, wherein the upper member and the lower member have substantially the same cross-sectional profile and the side members have substantially the same cross-sectional profile.

9. The structure of claim 1, wherein the upper member and the lower member have different cross-sectional profiles and the side members have substantially the same cross-sectional profile.

10. The structure of claim 1, wherein the rear section is closed and the frame has an opening sufficient to view a license plate positioned between the first set of holes and the second set of holes.

11. A device for attaching a license plate to a vehicle, comprising:
    a. a rear section having holes for securing the license plate to the vehicle therethrough;
    b. side arms extending forward of the rear section, the rear section having an upper edge, a lower edge, and side edges bridging the upper and lower edges, wherein the side arms further extend upward from the rear section, downward from the rear section, and outward from the rear section, the side arms extending beyond the upper edge and below the lower edge and outwardly beyond the side edges; and
    c. an upper cross-member bridging the upper portion of the side arms, and a lower cross-member bridging the lower portion of the side arms, wherein the upper cross-member has a substantially straight central portion and upwardly angled outer portions extending from the upper cross-member central portion to the respective side arms, and the lower cross-member has a substantially straight central portion and downwardly angled outer portions extending from the lower cross-member central portion to the respective side arms.

12. The device of claim 11, wherein the upper cross-member and the lower cross-member are connected to the rear section.

13. The device of claim 11, wherein the cross-members include a set of recessed holes aligned with the holes in the rear section, for positioning the license plate therebetween.

14. The device of claim 11, wherein the upper cross-member is connected to the rear section along its entire length.

15. The device of claim 11, wherein the lower cross-member is connected to the rear section along its entire length.

16. The device of claim 11, wherein the upper cross-member and the lower cross-member have substantially the same cross-sectional profile.

17. The device of claim 11, wherein the upper cross-member and the lower cross-member have different cross-sectional profiles.

18. A license plate frame for a vehicle, comprising:
   a. a rear section for abutting the vehicle, the rear section having an upper edge, a lower edge, and side edges bridging the upper and lower edges, wherein the rear section has rear lobes extending therefrom, wherein each rear lobe has a hole therethrough;
   b. a front section for framing the license plate, wherein the front section has front lobes extending therefrom, the lobes extending beyond the upper edge and below the lower edge and outwardly beyond the side edges, wherein each front lobe has a recessed hole therethrough aligned with each hole in each rear lobe, and wherein the front section has a front face that is closer to the rear section at its middle than at its ends, and the front face has an upper cross-member bridging the upper portion of the front lobes, and a lower cross-member bridging the lower portion of the front lobes, wherein the upper cross-member has a substantially straight central portion and upwardly angled outer portions extending from the upper cross-member central portion to the front lobes, and the lower cross-member has a substantially straight central portion and downwardly angled outer portions extending from the lower cross-member central portion to the front lobes.

19. The frame of claim 18, wherein the frame further comprises side arms connected to the rear section and the front section, wherein the side arms extend upwardly and outwardly from the rear section and the front section.

20. The frame of claim 18, further comprising a fin having a substantially planar surface extending upwardly and rearwardly from the rear section.

* * * * *